(12) United States Patent
Carpenter, Jr.

(10) Patent No.: US 7,236,341 B1
(45) Date of Patent: Jun. 26, 2007

(54) LIGHTNING TERMINATION PREVENTER

(75) Inventor: Roy B. Carpenter, Jr., Niwot, CO (US)

(73) Assignee: Lightning Eliminators & Consultants, Inc., Boulder, CO (US)

( * ) Notice: Subject to any disclaimer, the term of this patent is extended or adjusted under 35 U.S.C. 154(b) by 0 days.

(21) Appl. No.: 11/379,271

(22) Filed: Apr. 19, 2006

(51) Int. Cl.
*H02H 1/00* (2006.01)

(52) U.S. Cl. ..................................... 361/117

(58) Field of Classification Search ................ 361/212, 361/117
See application file for complete search history.

(56) References Cited

U.S. PATENT DOCUMENTS

| | | | |
|---|---|---|---|
| 0,315,679 A | | 4/1885 | Upton |
| 0,357,050 A | | 2/1887 | Vail |
| 1,743,526 A | | 1/1930 | Cage |
| 4,180,698 A | * | 12/1979 | Carpenter, Jr. .................. 174/2 |
| 4,605,814 A | | 8/1986 | Gillem |
| 5,043,527 A | * | 8/1991 | Carpenter, Jr. .................. 174/2 |
| 5,932,838 A | * | 8/1999 | Carpenter, Jr. .................. 174/2 |

OTHER PUBLICATIONS

N. I. Petrov and R. T. Waters, Determination of the striking distance of lightning to earthed structures, Proc, R, Soc. Lond. A (1995) 450, 589-601.*

* cited by examiner

*Primary Examiner*—Stephen W. Jackson
*Assistant Examiner*—Lucy Thomas
(74) *Attorney, Agent, or Firm*—Rick Martin; Patent Law Offices of Rick Martin, P.C.

(57) ABSTRACT

A lightning termination preventer (LTP) system to prevent the termination of a lightning stroke within a protected area is disclosed. The LTP system may comprise one or more ionizer arrays located above a protected area. The ionizer arrays are electrically connected to a grounding system and may comprise an essentially flat surface with a plurality of vertical ionizer protrusions. The ionizer protrusions may comprise a blunt distal end. The ionizer arrays may comprise a variety of shapes and may also comprise a short skirt. The radius of protection of a single ionizer array may be estimated. Additionally, the area protected by a plurality of ionizer arrays may be estimated.

20 Claims, 11 Drawing Sheets

LIGHTNING TERMINATION PREVENTER

BACKGROUND

Lightning protection systems may be divided into two categories—stroke collection/diversion systems and stroke prevention systems. Stroke collection/diversion systems are designed and deployed to divert a lightning termination away from a protected facility. They cannot prevent a termination of a lightning discharge in the general vicinity of the protected facility—they simply collect a stroke and provide a diversionary path to ground.

Stroke collection/diversion systems are best typified by conventional lightning rod systems. Such systems typically comprise an air terminal, a downconductor, and a grounding system. They function by collecting the stroke at a preferred location (e.g. a metallic air terminal) and conducting it to earth via a preferred path (e.g a downconductor).

Conversely, stroke prevention systems are intended to prevent a stroke from terminating within a protected area or on a protected system. Stroke prevention systems are often referred to as dissipative systems.

U.S. Pat. No. 5,043,527, to Carpenter, discloses a stroke prevention system called a Dissipation Array System ("DAS"). The DAS was designed to prevent lightning terminations within a protected area. However, because of the limited scientific data and operational history, the original designs were found to be of limited effectiveness. That, under certain conditions, strokes were collected by the DAS rather than prevented.

Subsequent to the referenced patent filing better Atmospheric Physics data became available; and DAS operational reports were collected that indicated some design weakness of the original DAS concepts. Further studies were commissioned to determine the design revisions required. Those studies resulted in the development of a virtually new generation of lightning strike termination preventors.

The major developments as expressed within this patent include a much flatter (vertically oriented) ionizer, a larger ionizer area as related to the risk factor, the use of less then sharp ionizer members and a better definition of the protected area size and shape. Additionally, Carpenter does not teach a method of determining DAS coverage. Consequently, what is needed is a lightning stroke prevention system that may be optimized for effectiveness and a method of determining the coverage of such lightning stroke prevention system.

A lightning stroke prevention system herein referred to as a lightning termination preventer (LTP) system is disclosed. The LTP system helps prevent the termination of a lightning stroke within the area protected by the LTP system. The LTP system may be designed in a manner to maximize its effectiveness. Furthermore, the coverage of the LTP system may be estimated.

SUMMARY

A LTP system helps prevent the termination of a lightning stroke within a protected area. The LTP system may comprise one or more ionizer arrays located above a protected area. The ionizer arrays may be elevated above the protected area via a dedicated structure, such as a supporting pole. Alternately, the ionizer arrays may be mounted to an existing structure within the protected area, including a structure to be protected. The ionizer arrays are electrically connected to a grounding system.

The one or more ionizer arrays may comprise an essentially flat surface with a plurality of ionizer protrusions. The ionizer protrusions may comprise a blunt distal end. The ionizer arrays may comprise a variety of shapes and may also comprise a short skirt along a peripheral edge.

The radius of protection of a single ionizer array may be estimated. Additionally, the area protected by a plurality of ionizer arrays may be estimated.

These and other features and advantages of the LTP system reside in the construction of parts and the combination thereof, the mode of operation and use, as will become more apparent from the following description, reference being made to the accompanying drawings that form a part of this specification wherein like reference characters designate corresponding parts in the several views. The embodiments and features thereof are described and illustrated in conjunction with systems, tools and methods which are meant to exemplify and to illustrate, not being limiting in scope.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Figure 1:
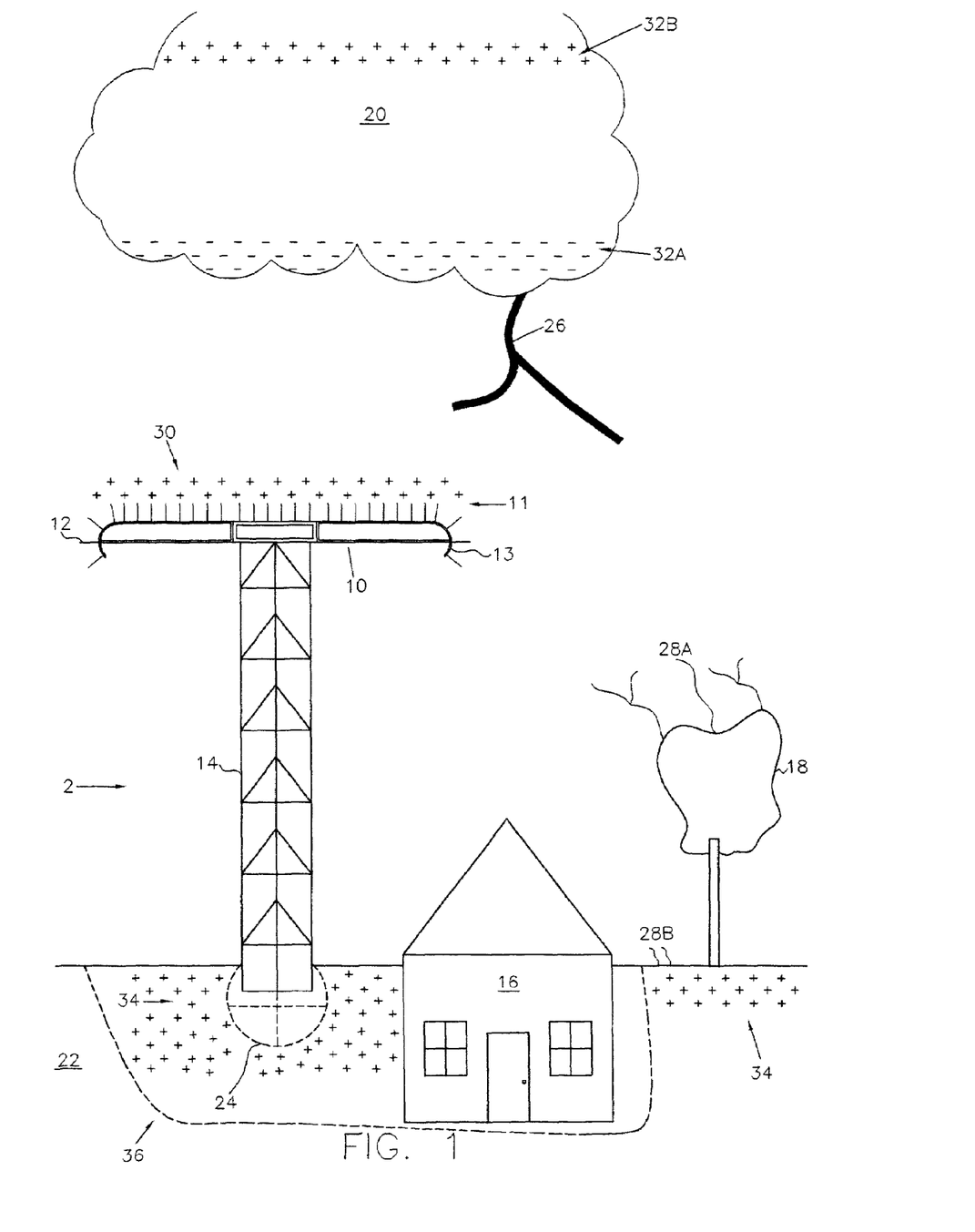
FIG. 1 is a side plan view of the operation of a LTP system.

FIG. 1 is a side plan view of the operation of LTP system 2. Ionizer array 10, which comprises ionizer protrusions 12, is supported by support structure 14. Support structure 14 also connects ionizer array 10 to grounding system 24, which is embedded in ground segment 22. Ionizer array 10 may comprise top surface 11 which is essentially flat. Ionizer array 10 may also comprise short skirt 13.

Atmospheric physics teaches that lightning terminations are the result of a descending lightning leader 26 being collected by an earth initiated rising stream of ions (streamers) 28B, sometimes referred to as counter leaders. Streamers 28A may also originate from objects connected to the earth, such as tree 18. For example, lightning would terminate on tree 18 if leader 26 was collected by streamer 28A arising from tree 18.

LTP system 2 prevents lightning termination by delaying the launch of a streamer from protected area 36. Due to the absence of a streamer from protected area 36, a descending lightning leader will not have anything to connect to in protected area 36. Consequently, a descending lightning leader will connect to a streamer from outside protected area 36 of LTP system 2. For example, because structure 16 is located within protected area 36, LTP system 2 prevents the launch of a streamer from structure 16. Therefore, descending lightning leader 26 will connect to a streamer originating from outside of protected area 36. Lightning will thereby terminate outside protected area 36. In this manner LTP system 2 prevents the termination of lightning leader 26 within protected area 36 and diverts it to outside protected area 36. Structure 16 is thereby protected from lightning termination.

LTP system 2 prevents the launch of a streamer from protected area 36 by creating a dense ion plasma or space charge 30 above ionizer array 10. Space charge 30 blocks the launch of steamers from within its area of influence or protected area 36.

LTP system 2 creates space charge 30 as follows. Storm cell 20 comprises opposing charges 32A and 32B. Generally, charge 32A (closest to the earth) is negative while charge 32B is positive. However, the polarities of charges 32A and 32B may be reversed.

Storm cell 20 induces charge 34 on ground segment 22. Charge 34 has a polarity opposite of charge 32A. Thus, because charge 32A is negative in FIG. 1, charge 34 is positive in FIG. 1.

In the absence of LTP system 2, charge 34 creates streamers from ground segment 22 or objects attached to ground segment 22, such as structure 16. However, LTP system 2 diverts charge from ground segment 22 in the vicinity of protected area 36 to ionizer array 10. Charge 34 is conducted from ground segment 22 to ionizer protrusions 12 via grounding system 24, a conductor in support structure 14, and conductors in ionizer array 10. Ionizer protrusions 12 create space charge 30 which delays the launch of streamers from within protected area 36 and thereby prevent lightning termination within protected area 36.

Figure 2:
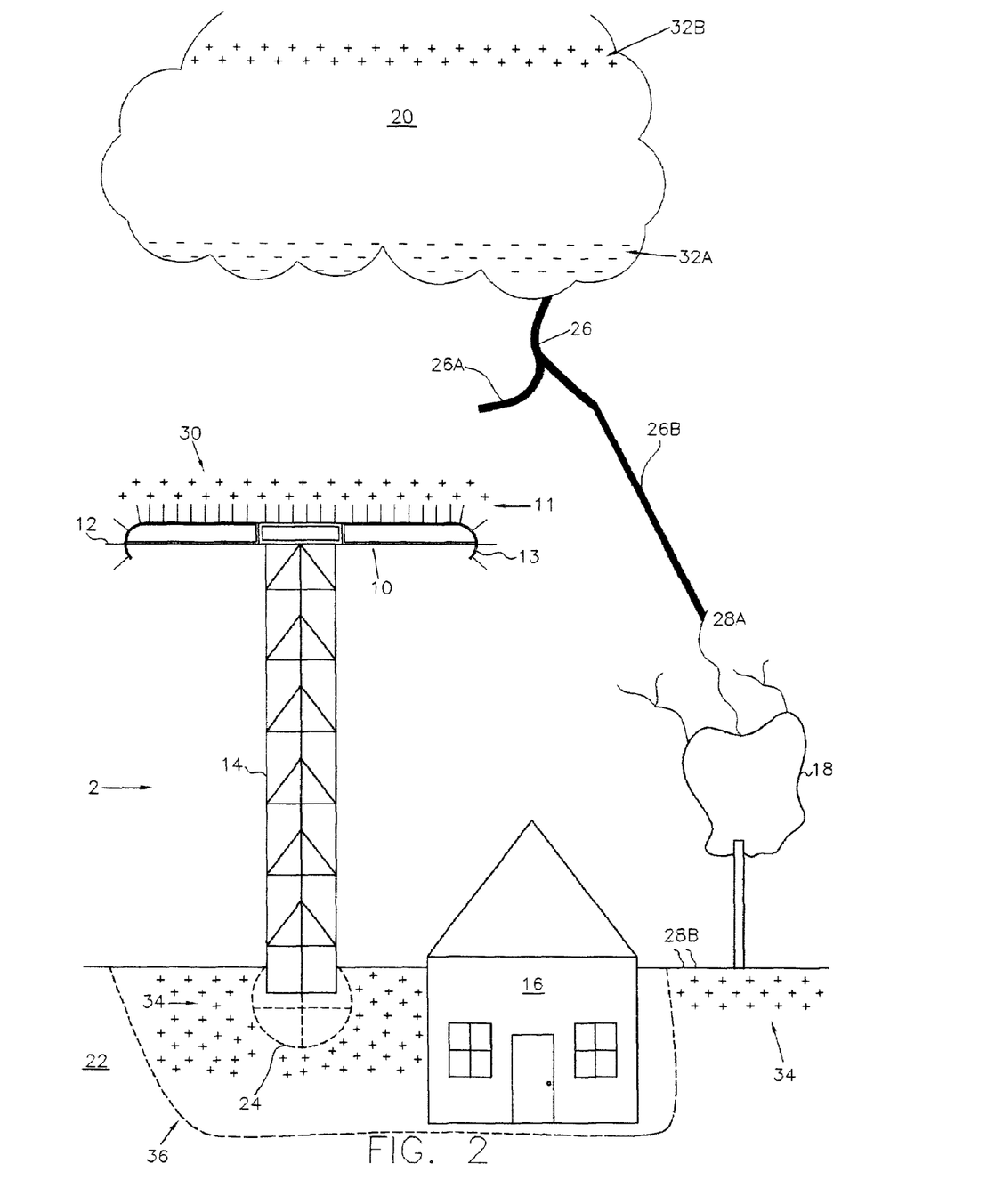
FIG. 2 is a side plan view of the operation of a LTP system.

FIG. 2 shows the termination of descending lightning leader 26 outside of protected area 36 of LTP system 2. Space charge 30 prevents the launch of leaders from within protected area 36. Therefore, descending lightning leader 26A does not have a streamer from within protected area 36 to terminate to. Consequently, descending lightning leader 26B "wins" and connects to streamer 28A originating from tree 18. LTP system 2 thereby prevents descending lightning leader 26A from terminating within protected area 36 and protects structure 16 from lightning termination.

Figure 3:
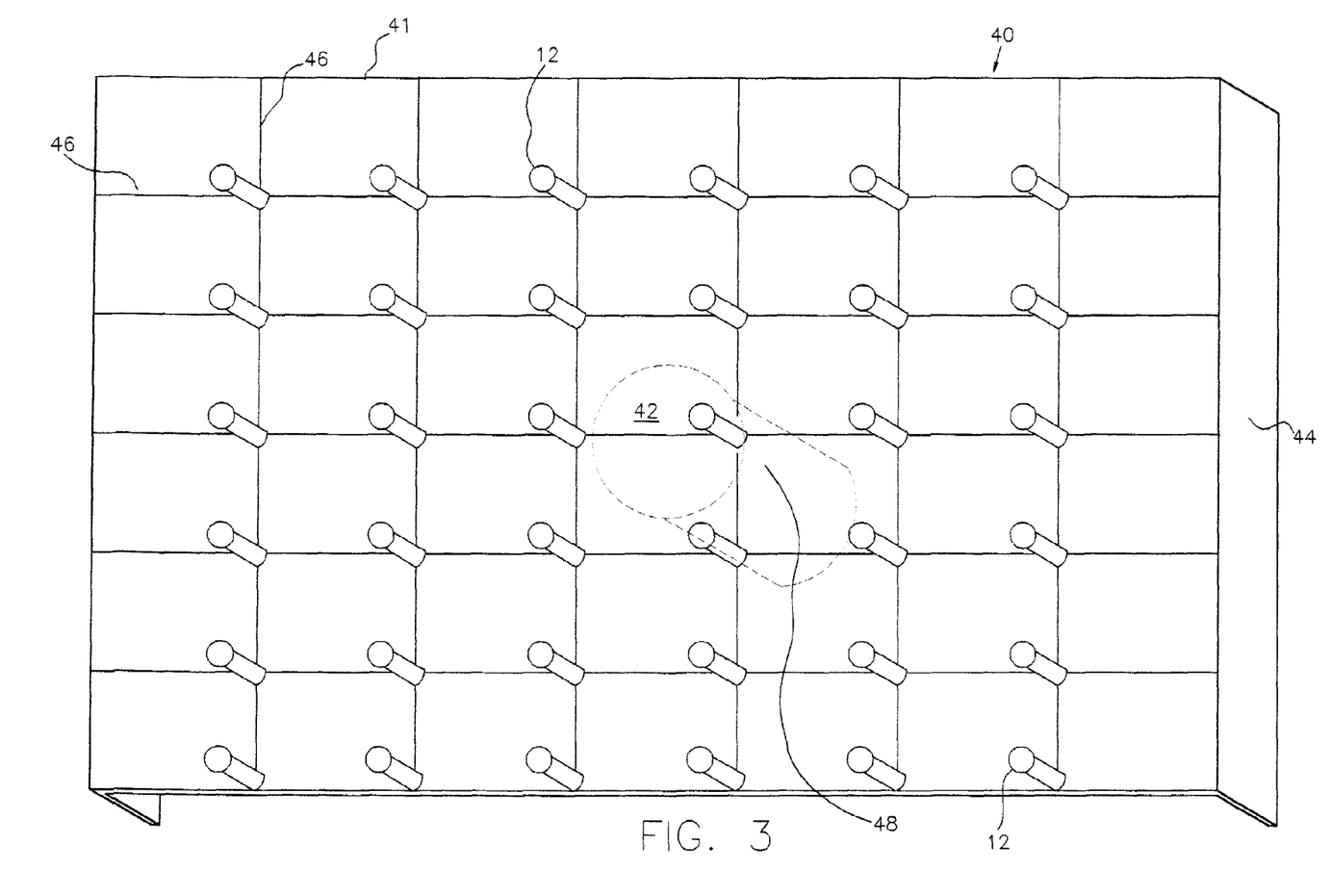
FIG. 3 is a top perspective view of a LTP system ionizer array.

FIG. 3 is a top perspective view of LTP ionizer array 40. Ionizer array 40 may comprise center member 42, which is connectable to a support structure and may serve as ground connection point 48. Frame 41, which may be constructed of steel framework, may be used to support grid 46. Grid 46, which may be constructed of wire, may provide support for ionizer protrusions 12. Additionally, grid 46 may provide electrical connectivity between ionizer protrusions 12 and ground connection point 48. Ionizer array 40 may also comprise skirt 44, which may be constructed of wire in an open frame manner.

Ionizer array 40 may comprise a plurality of ionizer protrusions 12. The density of ionizer protrusions 12 may range from 50 to 250 ionizer protrusions per square meter. Ionizer protrusions 12 may be distributed throughout ionizer array 40 in an uniform manner in order to facilitate the creation of an uniform space charge.

Figure 4A:
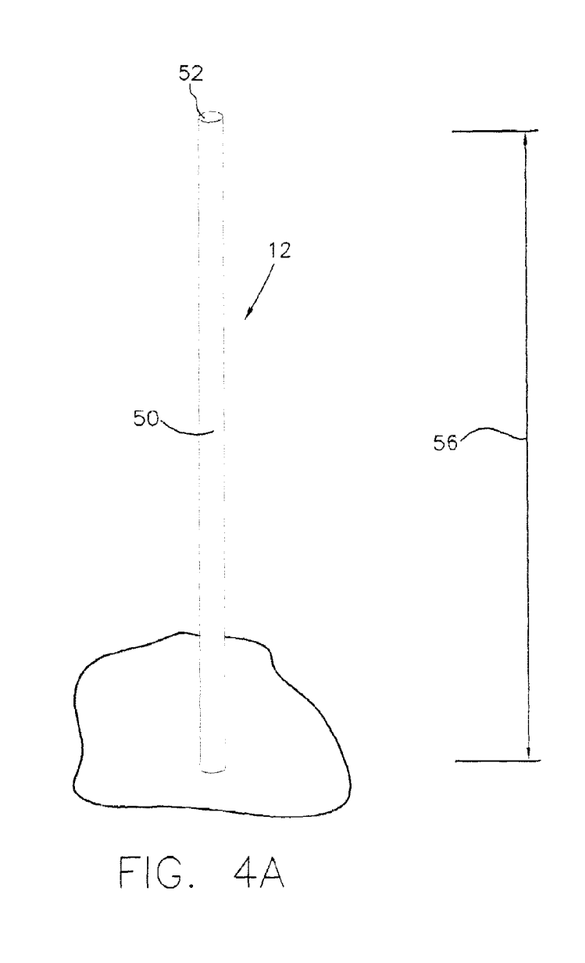
FIG. 4A is a side perspective view of an embodiment of an ionizer protrusion.

FIG. 4A is a side perspective view of an embodiment of LTP system ionizer protrusion 12. Ionizer protrusion 12 may comprise cylinder 50 with flat top 52. Ionizer protrusion 12 may have length 56 ranging from 10 centimeters to 20 centimeters.

Figure 4B:
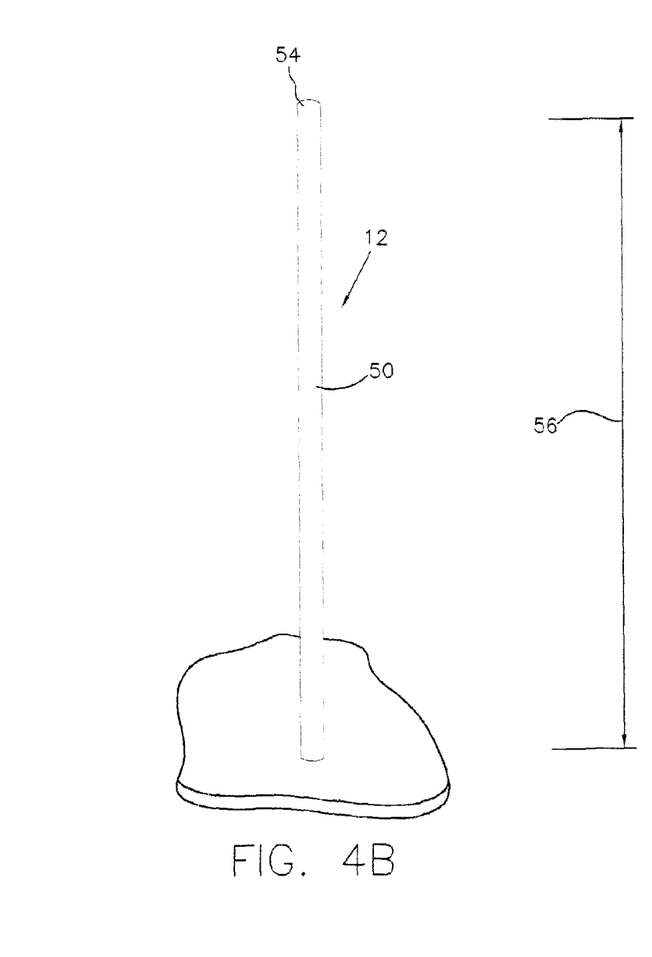
FIG. 4B is a side perspective view of an embodiment of an ionizer protrusion.

FIG. 4B is a side perspective view of an embodiment of LTP system ionizer protrusion 12. Ionizer protrusion 12 may comprise cylinder 50 with rounded top 54. Ionizer protrusion 12 may have length 56 ranging from 10 centimeters to 20 centimeters.

Embodiments of ionizer protrusions other than those shown in FIGS. 4A and 4B are possible. However, embodiments comprising blunt protrusions, such as those shown in FIGS. 4A and 4B comprising flat top 52 and rounded top 54, respectively, may be more effective than some other embodiments. Although sharp ionizer protrusions go into ionization faster than other shapes, they go through dramatic changes in ion current flow every millisecond. The space charge generated by blunt ionizer protrusions, such as those shown in FIGS. 4A & 4B, may be more uniform than the space charge generated by sharp ionizer protrusions. Because discontinuities in a space charge present a risk that a counter leader will be launched from within the area protected by the ionizer, using blunt ionizer protrusions, such as those shown in FIGS. 4A & 4B, rather than sharp ionizer protrusions (not shown), may present a lesser risk that a counter leader will be launched from within the area protected by the ionizer.

Figure 5:
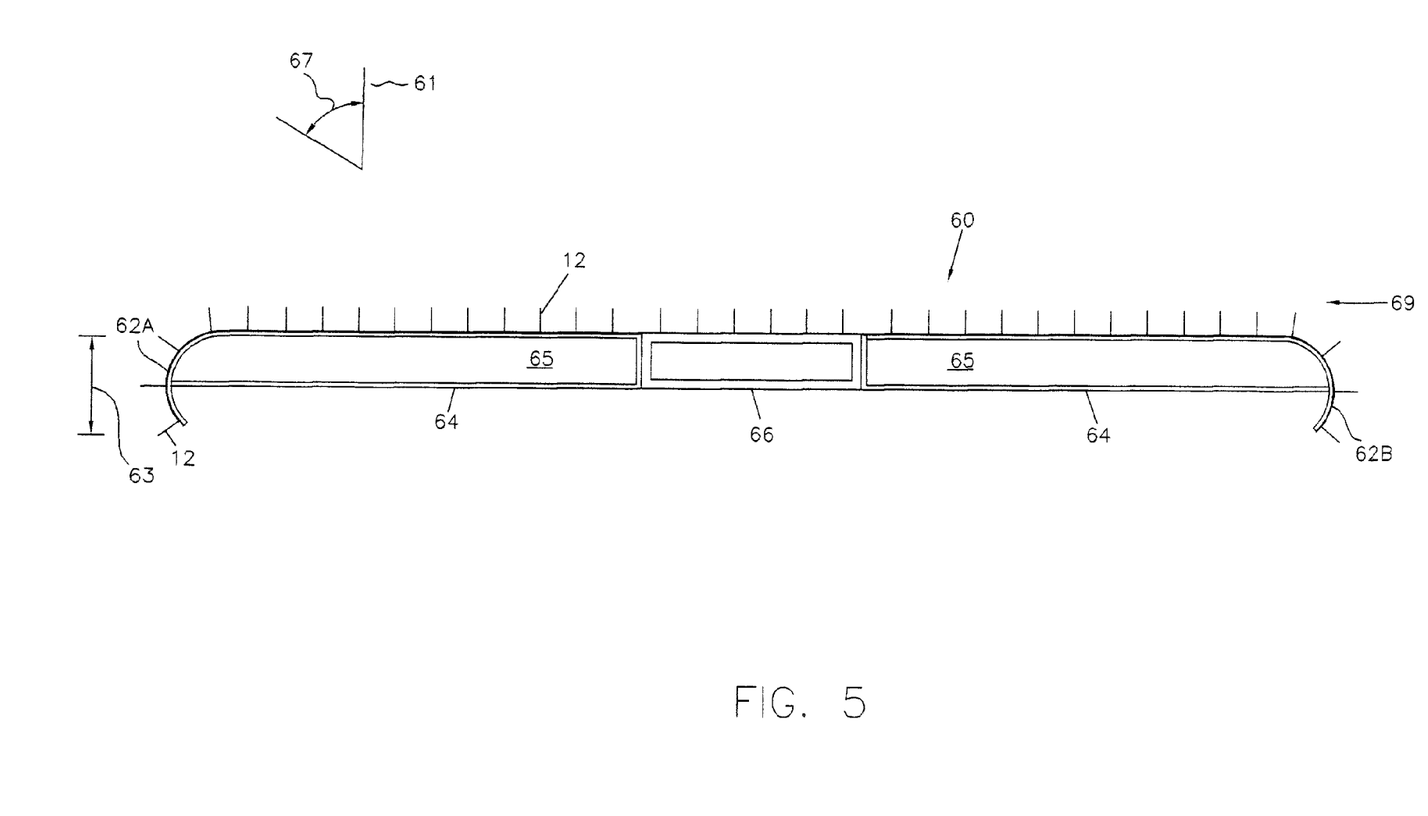
FIG. 5 is a side plan view of an embodiment of an ionizer array.

FIG. 5 is a side plan view of an embodiment of an ionizer array. Ionizer array 60 may comprise essentially flat surface 69 with the possible exception of skirts 62A and 62B.

Angle 67 is the angle of approach of lightning from vertical line 61. Vertical line 61 is perpendicular to flat surface 69. Skirts 62A and 62B are generally needed when lightning is likely to approach ionizer array 60 at an angle 67 of more than thirty degrees. Such situation is likely to occur if ionizer array 60 is located at a high elevation, such as on a tall support structure or on a steep mountain. The more likely angle 67 is to be large, the larger height 63 of skirts 62A and 62B must be. By way of example and not of limitation, height 63 of skirts 62A and 62B may range from 10 centimeters to 1 meter.

An ionizer array having an essentially flat surface creates a more uniform space charge than an ionizer array not having an essentially flat surface. Because discontinuities in the space charge present a risk that a counter leader will be launched from within the area protected by the ionizer array, constructing ionizer array 60 with essentially flat surface 69 may increase the effectiveness of ionizer array 60.

Ionizer array 60 may comprise ionizer protrusions 12, which may be mechanically supported by a wire grid (not shown, but similar to grid 46 of FIG. 3). Ionizer protrusions 12 may be distributed throughout ionizer array 60 in a uniform manner. An ionizer protrusion 12 may be connected to the wire grid at each intersection of two wires within the wire grid. The wire grid may also provide electrical connectivity between ionizer protrusions 12 and center member

66. By way of example and not of limitation, ionizer protrusions 12 may be designed and constructed such that the length of any one ionizer protrusion 12 does not vary from the average length of all ionizer protrusions 12 by more than one half to one percent. Uniformity is the distribution of ionizer protrusions 12 and/or the length of ionizer protrusions 12 may increase the effectiveness of ionizer array 60 by facilitating the creation of a uniform space charge by ionizer array 60.

Ionizer array 60 may be supported by frame 64. Frame 64 may be constructed of any suitable material, such as a wire matrix or steel framework. Surface 65 of frame 64 may be open or may be a solid surface.

Figures 6A, 6B:
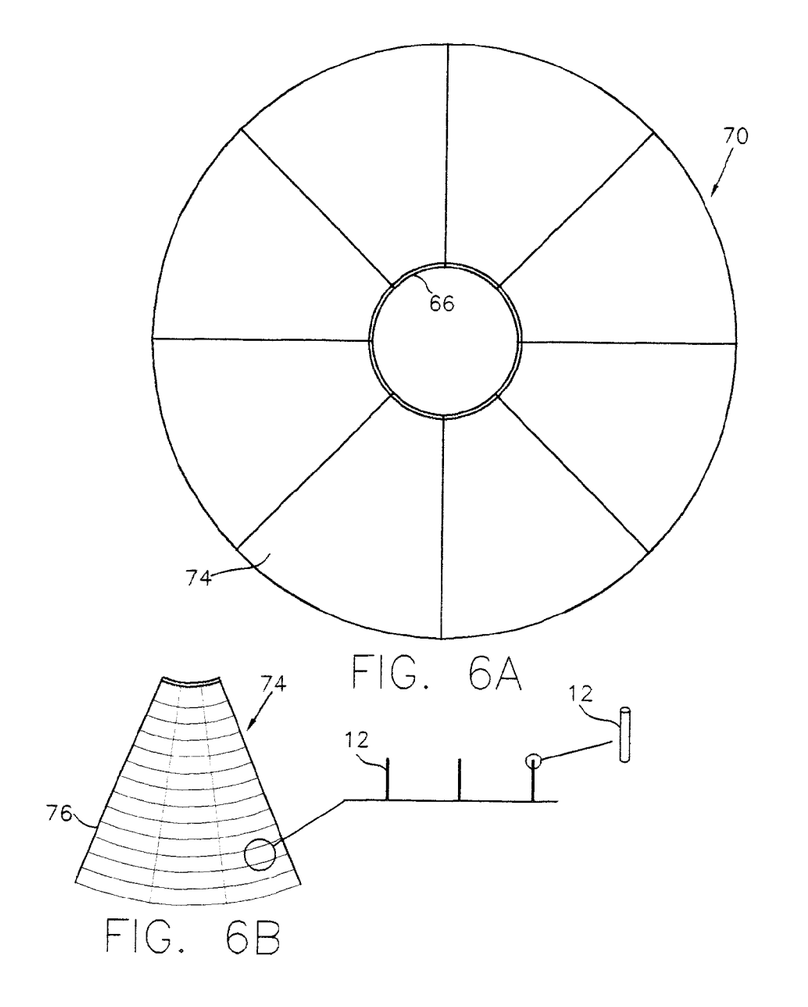
FIG. 6A is a top plan view of an embodiment of an ionizer array.
FIG. 6B is a top plan view of a section of the ionizer array of FIG. 6A.
Figure 6C:
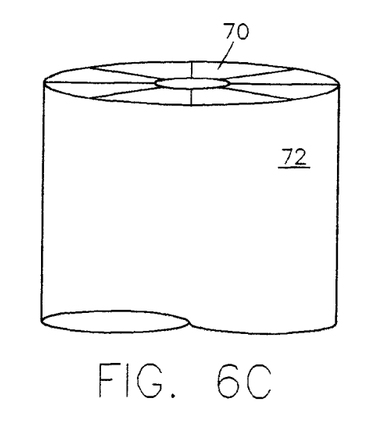
FIG. 6C is a side perspective view of the ionizer array of FIG. 6A installed on a structure.

FIG. 6A is a top plan view of an embodiment of an ionizer array. Ionizer array 70 may be intended to be mounted on the top of a structure, such as stack or chimney 72, as shown in FIG. 6C. Ionizer array 70 may comprise an essentially flat top surface.

Ionizer array 70 may be round, as shown in FIG. 6A. Ionizer array 70 may comprise center member 66.

Ionizer array 70 may comprise ionizer module 74. Ionizer module 74, which is shown in FIG. 6B, may comprise wire support structure 76. Support structure 76, which may comprise multiple wire sections connected together, may provide mechanical support for ionizer protrusions 12. Support structure 76 may also provide electrical connectivity between ionizer protrusions 12, ionizer array 70, and center member 66. Ionizer protrusions 12 may be distributed throughout ionizer module 74 and/or ionizer array 70 in a uniform manner.

Figure 7A:
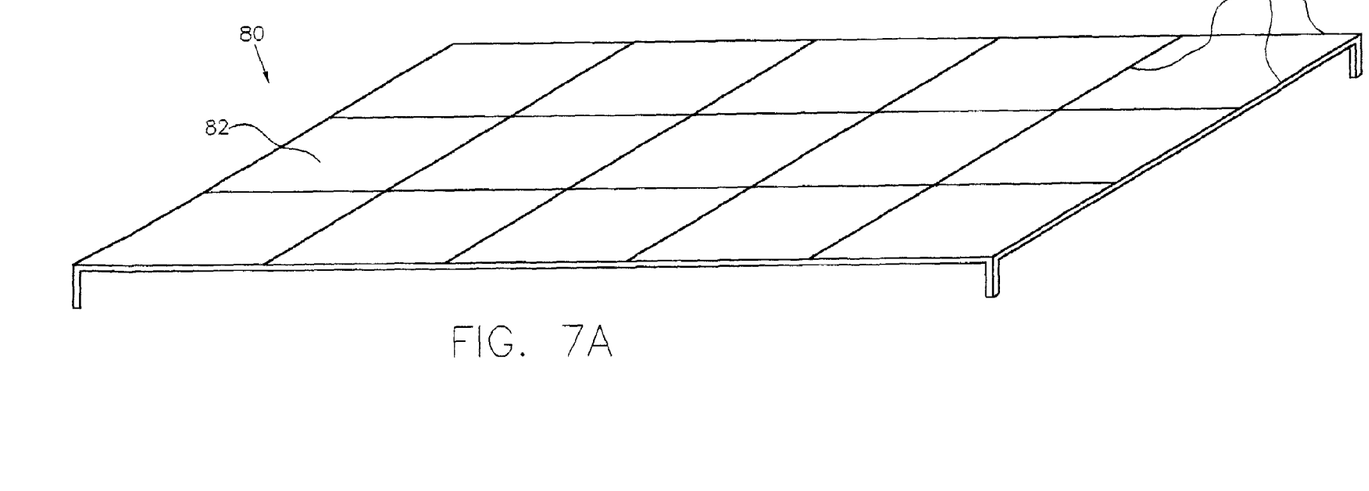
FIG. 7A is a top perspective view of an ionizer array assembly.

FIG. 7A is a top perspective view of ionizer array assembly 80, which comprises a plurality of ionizer array modules 82. Ionizer array assembly 80 may be of any shape and of any size. Ionizer array assembly 80 may be supported by frame 83. Frame 83 may be constructed of any suitable material, such as steel framework.

Figure 7B:
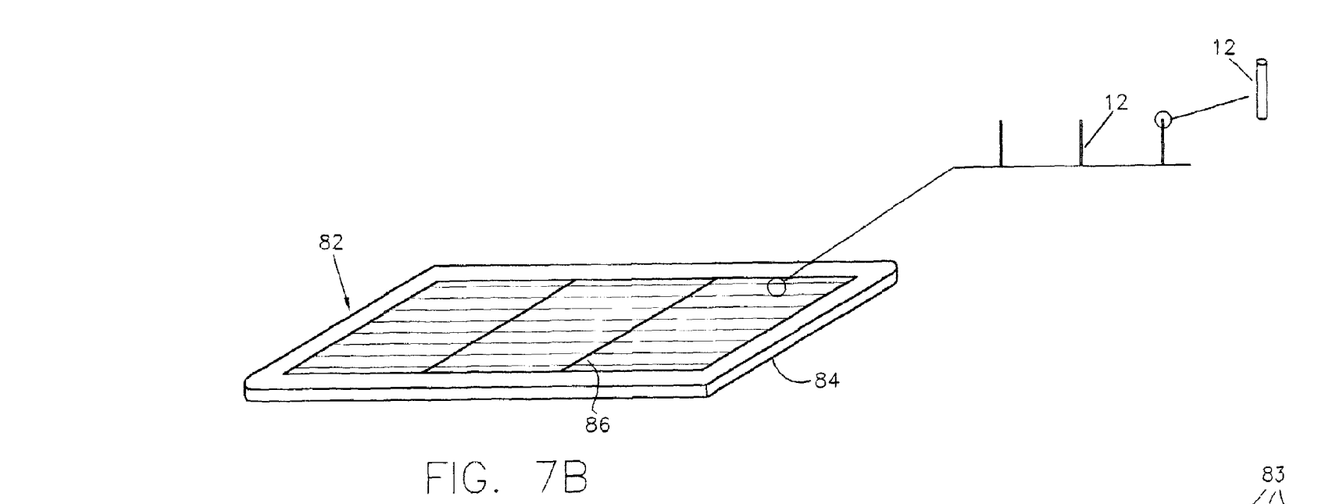
FIG. 7B is a top perspective view of an ionizer array module.

FIG. 7B is a top perspective view of ionizer array module 82. Ionizer array module 82 may comprise frame 84 and support structure 86. Support structure 86 may provide mechanical support for ionizer protrusions 12. Ionizer protrusions 12 may be distributed throughout ionizer array assembly 80 and/or ionizer array module 82 in a uniform manner. Support structure 86 may comprises a plurality of wires or rigid conductors joined together. Support structure 86 may also provide electrical connectivity between ionizer protrusions 12, and frame 84. It is to be understood that although ionizer array module 82 is shown as rectangular in shape, ionizer array module 82 can comprise a variety of shapes.

The modular construction of ionizer array assembly 80 may facilitate the construction of an ionizer array with a large surface area. An ionizer array with a large surface area may be more effective at stopping lighting terminations than an ionizer array with a smaller surface area. For example, increasing the radius of an ionizer array from 1 meter to 6 meters may decrease the expected number of downward lightning discharges by a factor of 7.4.

Figure 8:
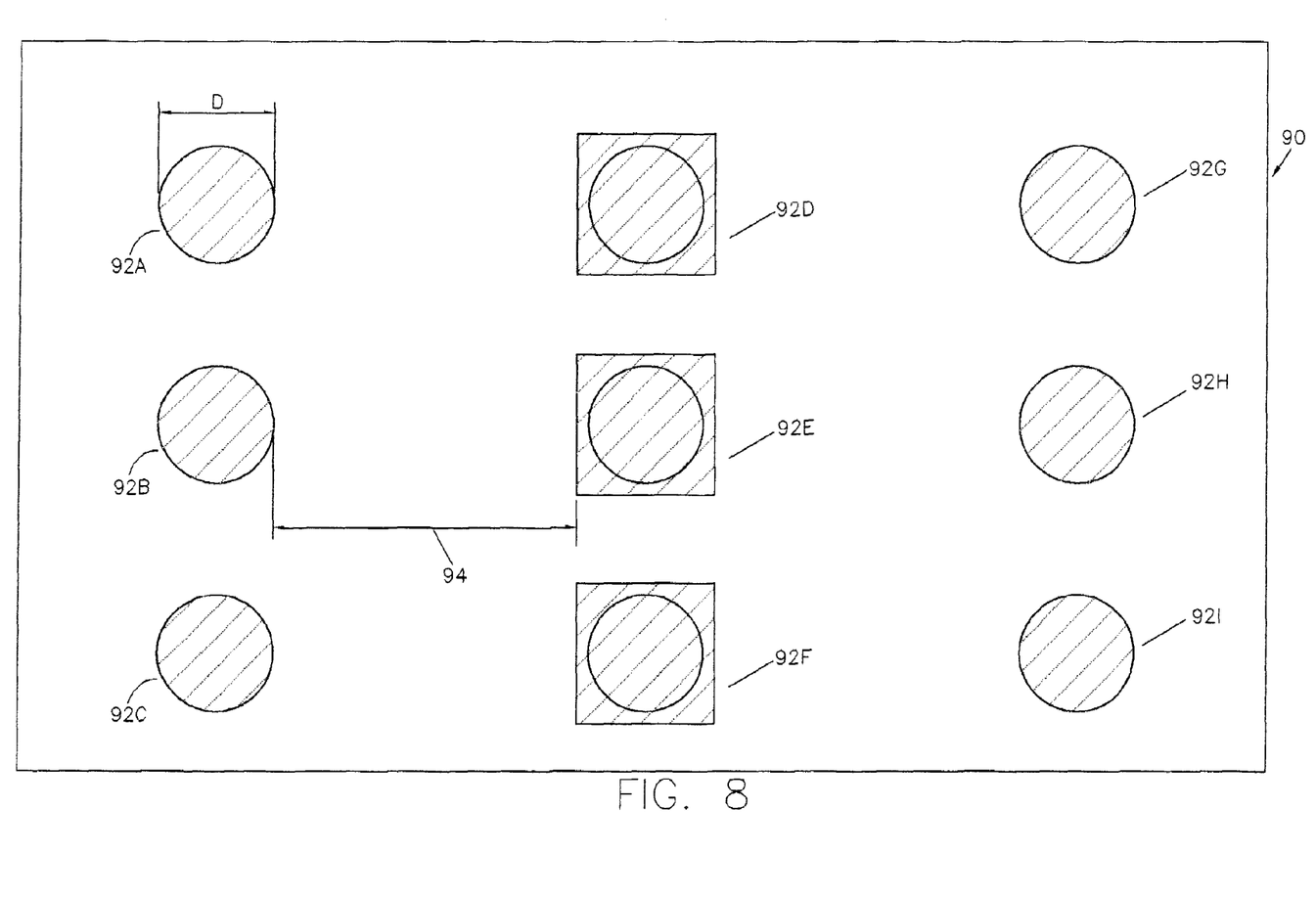
FIG. 8 is a top plan view of an area protected by a plurality of ionizer arrays.

FIG. 8 is a top plan view of protected area 90, which is protected by plurality of ionizer arrays 92A–92I. Although protected area 90 of FIG. 8 is protected by nine ionizer arrays, a protected area could comprise any number of ionizer arrays.

The shape, size, and configuration of ionizer arrays in a protected area may vary. Separation distance 94 between ionizer arrays may also vary. The shape, size, and configuration of ionizer arrays as well as the separation distances between them may be selected to provide a desired protected area and/or a uniform space charge above the protected area. By way of example and not of limitation, protected area 90 comprises six round ionizer arrays of diameter D, 92A–92C and 92G–92I, and three square ionizer arrays, 92D, 92E, and 92F.

Figure 9:
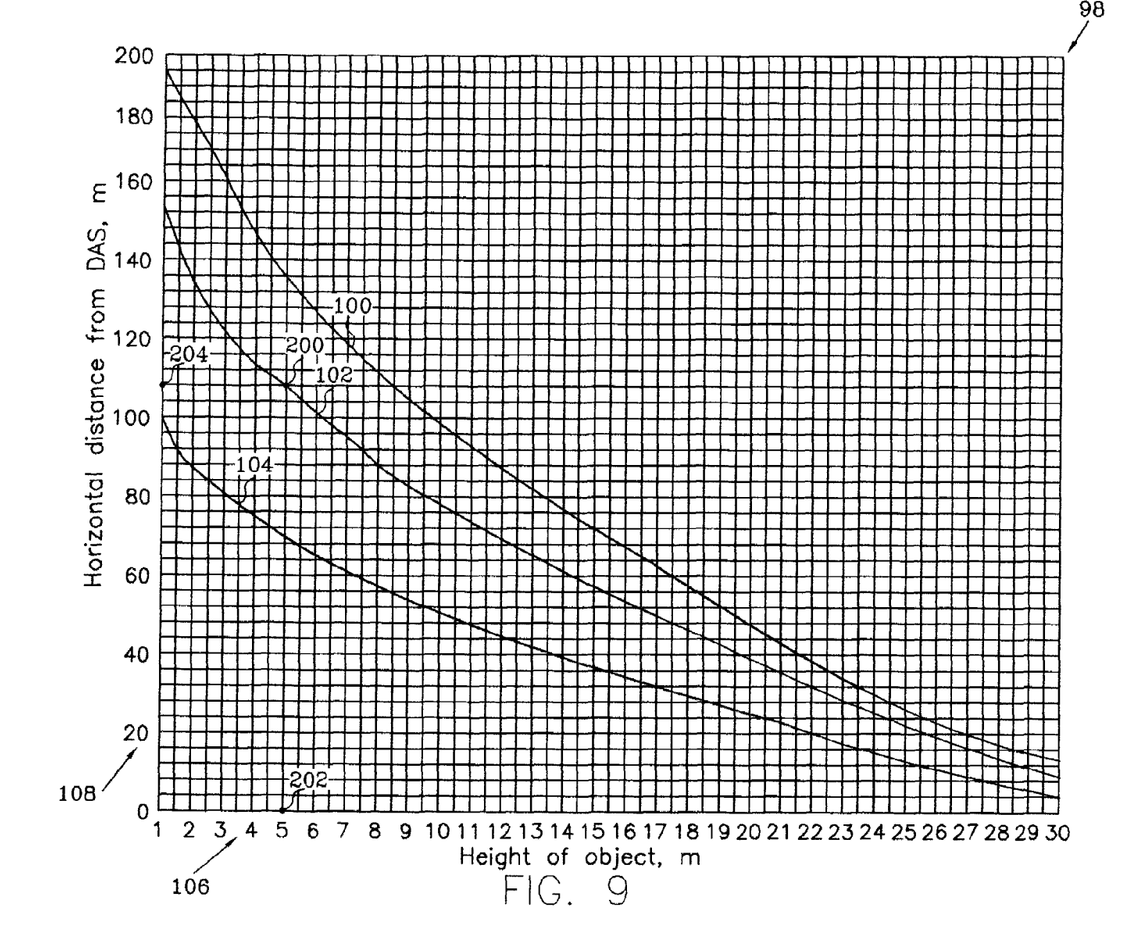
FIG. 9 is a graph showing protection radii of three embodiments of ionizer arrays.

FIG. 9 comprises graph 98 showing protection radii of three embodiments of ionizer arrays. By way of example and not of limitation, curve 100 corresponds to a round ionizer array with a diameter of 362 inches, curve 102 corresponds to a round ionizer array with a diameter of 272 inches, and curve 104 corresponds to a round ionizer with a diameter of 134 inches. By way of example and not of limitation, curves 100, 102, and 104 correspond to ionizer arrays raised 30 meters above local grade.

Horizontal axis 106 represents the height above local grade of the object that is to be protected. Vertical axis 108 represents the maximum distance the object may be located away from the ionizer array base and still be protected. The following is an example of use of graph 98. Assume that the ionizer array represented by curve 102 is to be used, and an object 5 meters tall is to be protected. A vertical line is drawn from 5 meters point 202 on horizontal axis 106 to curve 102. At the point 200 where the vertical line intersects curve 102, a horizontal line is drawn to vertical axis 108. The horizontal line intersects vertical axis 108 at 108 meters point 204. Therefore, under ideal conditions, an object 5 meters above grade would be protected out to 108 meters from the ionizer array, provided there are no high structures between the object and the ionizer array.

Curves 100, 102, and 104 may be derived as follows. The peak current of the return stroke (I) is estimated. By way of example and not of limitation, I may be estimated as 10 kilo-amperes. The leader charge (Q) is calculated, wherein $$Q = 10^{\frac{I-\log(10.6)}{0.7}}$$

columns. The striking distance (d) is calculated, wherein $$d = \sqrt{\frac{(0.2)(2)(9)(10^6)Q}{500}}$$

meters. The radius of protection for a single ionizer protrusion ($R_s$) is calculated, wherein $R_s = \sqrt{d^2 - (d-h)^2}$ meters, and h is the distance of the ionizer array above local grade in meters. The radius of protection for the ionizer array at ground level ($R_o$) is calculated, wherein $R_o = \sqrt{(R_s^2 + h^2)(kN)^{2/3} - h^2}$ meters. N is the number of ionizing protrusions in the ionizer array, and k is an efficiency factor, which may be determined by empirical tests. By way of example and not of limitation, k may be range from 0.1 to 0.9. Finally, the radius of protection of the ionizer array at a height $h_x$ above the ground ($R_x$) is calculated, wherein $$R_x = R_0 \left(1 - \sqrt{\frac{2dh_x - h_x^2}{2dh - h^2}}\right)$$

meters.

Figure 10:
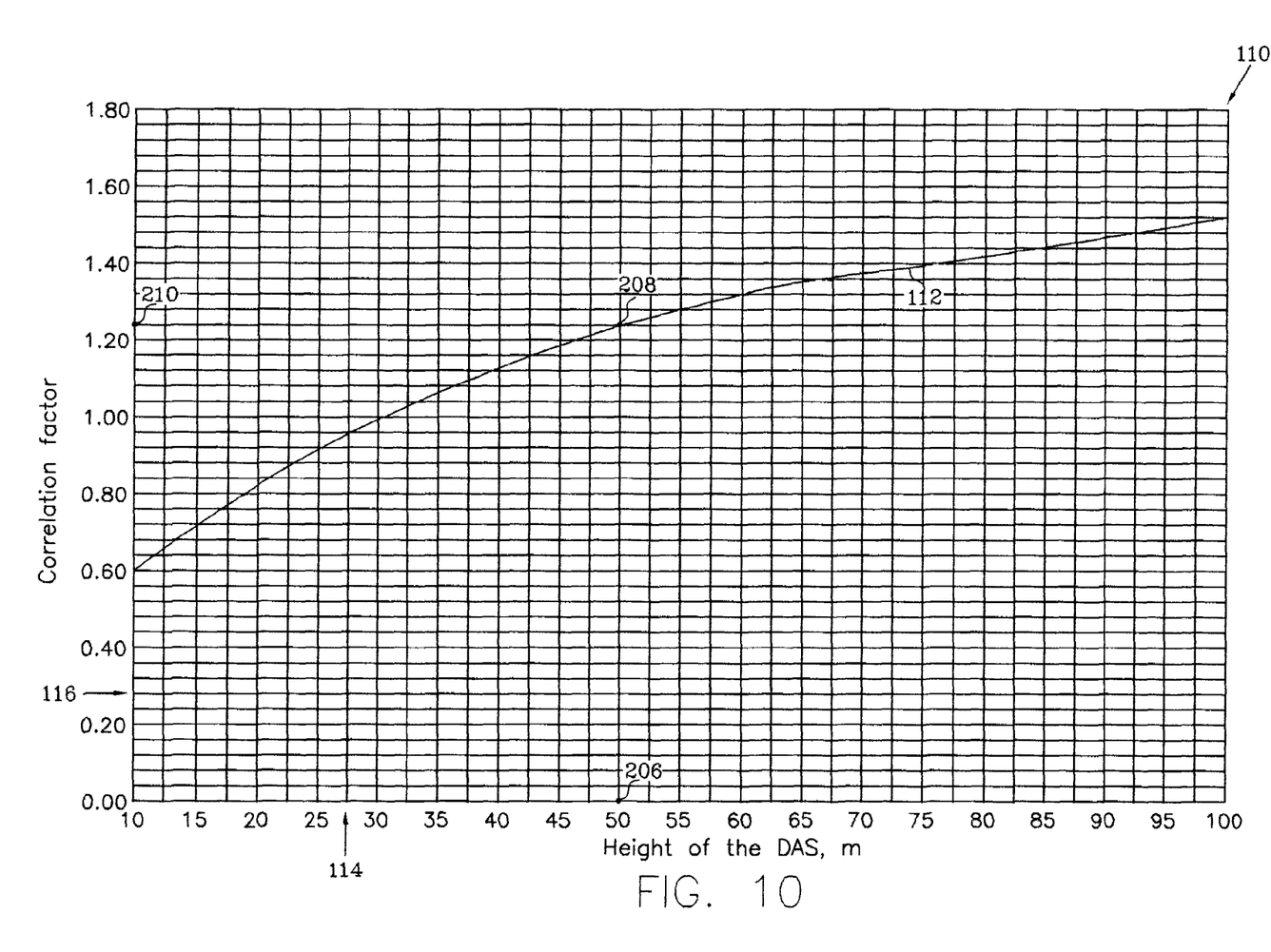
FIG. 10 is a graph of correlation factors which may be used to help determine the protection radii of ionizer arrays.

FIG. 10 comprises graph 110 of correlation factors which may be used to help determine the protection radii of ionizer arrays. Graph 110 may be used in conjunction with a graph that plots a radius of protection for an ionizer array of a fixed height, such as graph 98 of FIG. 9. For example, graph 110 may be used in conjunction with graph 98 to determine the radius of protection of an ionizer array of a height of other than 30 meters. Horizontal axis 114 of graph 110 corresponds to the height of the ionizer array above local grade. Vertical axis 116 corresponds to the correlation factor.

An example of use of graph 110 with graph 98 is as follows. Assume that the ionizer array represented by curve 102 is to be used, but the ionizer array is elevated 50 meters above local grade instead of 30 meters above local grade. Also assume that an object 5 meters tall is to be protected. Using graph 98, a vertical line is drawn from 5 meters point 202 on horizontal axis 106 to curve 102. At point 200, where the vertical line intersects curve 102, a horizontal line is drawn to vertical axis 108. The horizontal line intersects vertical axis 108 at 108 meters point 204. Because the ionizer array is elevated 50 meters (and not 30 meters) above local grade, graph 110 is also used. A vertical line is drawn from 50 meters point 206 on horizontal axis 114. Where the vertical line intersects curve 112 at point 208, a horizontal line is drawn. The horizontal line intersects vertical axis 116 at 1.22 point 210. Therefore, the correlation factor for a 50 meter tall ionizer array is 1.22. To determine the radius of protection for a 5 meter tall object, the radius of protection from graph 98 (108 meters) is multiplied by the correlation factor (1.22) for a final radius of protection of 132 meters.

Figure 11:
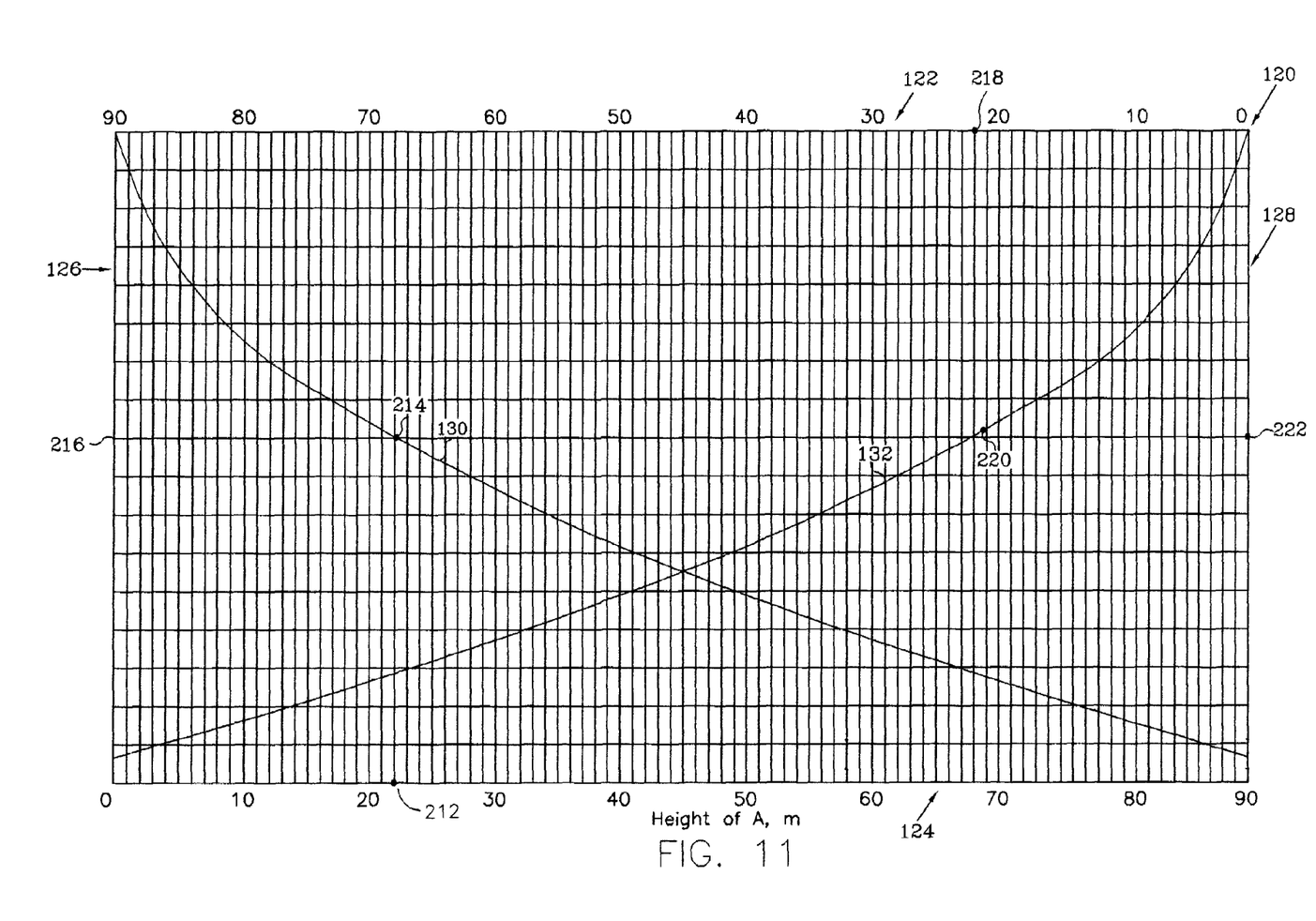
FIG. 11 is a graph showing the relationship between protection radii of adjacent ionizer arrays.

FIG. 11 comprises graph 120 showing the relationship between protection radii of two adjacent ionizer arrays. In FIG. 11, it is assumed that each ionizer array has the same height and that the spacing between the two ionizer arrays is the same as their height.

Vertical axis 126 corresponds to the radius of protection of the primary ionizer array. Vertical axis 128 corresponds to the radius of protection of the secondary ionizer array. Horizontal axis 124 corresponds to the height above local grade of the object to be protected by the primary ionizer array. Horizontal axis 122 corresponds to the height above local grade of the object to be protected by the secondary ionizer array.

Curves 130 and 132 show the relationship between radius of protection and height of the object to be protected by the primary ionizer array and the secondary ionizer array respectively. It should be noted that curves 130 and 132 are not additive. The radius of protection of an object of a given height above local grade is equal to the greater of the radius of protection provided by either the primary ionizer array or the secondary ionizer array—not the sum of the radii of protection provided by each ionizer array.

Graph 120 may used in a manner similar to that of graph 98 of FIG. 9. In order to determine the radius of protection provided by the primary ionizer array, one would use horizontal axis 124, curve 130, and vertical axis 126. In order to determine the radius of protection of the secondary ionizer array, one would use horizontal axis 122, curve 132, and vertical axis 128.

An example of use of graph 120 is as follows. Assume an object 22 meters above local grade is to be protected. The radius of protection of the primary ionizer array will be determined first. A vertical line is drawn from 22 meters point 212 on horizontal axis 124 to curve 130. At point 214 where the vertical line intersects curve 130, a horizontal line is drawn to vertical axis 126. The horizontal line intersects vertical axis 126 at point 216. Point 216 represents the radius of protection of the primary ionizer array for an object 22 meters above local grade.

The radius of protection of the secondary ionizer array will next be determined. A vertical line is drawn from 22 meters point 218 on horizontal axis 122 to curve 132. At the point 220 where the vertical line intersects curve 132, a horizontal line is drawn to vertical axis 128. The horizontal line intersects vertical axis 128 at point 222. Point 222 represents the radius of protection of the secondary ionizer array for an object 22 meters above local grade.

As noted above, the radii of protection of a plurality of ionizer arrays are not additive. Thus, in the above example, the radius of protection for an object 22 meters above local grade is the greater of radius of protection 216 or 222—not the sum of the two. Note that radii of protection 216 and 222 are equivalent in this case.

| PARTIAL GLOSSARY | |
|---|---|
| 2 | LTP system |
| 10 | ionizer array |
| 11 | array surface |
| 12 | ionizer points |
| 13 | skirt |
| 14 | support structure |
| 16 | structure |
| 18 | tree |
| 20 | storm cell |
| 22 | ground segment |
| 24 | grounding system |
| 26 | descending lightning leader |
| 26a | descending lightning leader |
| 26b | descending lightning leader |
| 28a | streamer |
| 28b | streamer |
| 30 | space charge |
| 32a | charge |
| 32b | charge |
| 34 | charge |
| 36 | protected area |
| 40 | ionizer array |
| 41 | frame |
| 42 | center member |
| 44 | skirt |
| 46 | grid |
| 48 | ground connection point |
| 50 | cylinder |
| 52 | flat top |
| 54 | rounded top |
| 56 | length |
| 60 | ionizer array |
| 61 | line |
| 62a | skirt |
| 62b | skirt |
| 63 | height |
| 64 | frame |
| 65 | surface |
| 66 | center member |
| 67 | angle |
| 69 | flat surface |
| 70 | ionizer array |
| 72 | stack or chimney |
| 74 | ionizer module |
| 76 | support structure |
| 80 | ionizer array assembly |
| 82 | ionizer module |
| 83 | frame |
| 84 | frame |
| 86 | support structure |
| 90 | protected area |
| 92a | ionizer array |
| 92b | ionizer array |
| 92c | ionizer array |
| 92d | ionizer array |
| 92e | ionizer array |
| 92f | ionizer array |
| 92g | ionizer array |
| 92h | ionizer array |

-continued

PARTIAL GLOSSARY

| | |
|---|---|
| 92i | ionizer array |
| 94 | separation distance |
| 98 | graph |
| 100 | curve |
| 102 | curve |
| 104 | curve |
| 106 | horizontal axis |
| 108 | vertical axis |
| 110 | graph |
| 112 | curve |
| 114 | horizontal axis |
| 116 | vertical axis |
| 120 | graph |
| 122 | top horizontal axis |
| 124 | bottom horizontal axis |
| 126 | left vertical axis |
| 128 | right vertical axis |
| 130 | curve 1 |
| 132 | curve 2 |
| 200 | point |
| 202 | 5 meter point |
| 204 | 108 meter point |
| 206 | 50 meter point |
| 208 | point |
| 210 | 1.22 point |
| 212 | 22 meter point |
| 214 | intersection point |
| 216 | intersection point |
| 218 | 22 meter point |
| 220 | intersection point |
| 222 | intersection point |

While a number of exemplifying features and embodiments have been discussed above, those of skill in the art will recognize certain modifications, permutations, additions and subcombinations thereof. No limitation with respect to the specific embodiments disclosed herein is intended or should be inferred.

I claim:

1. A lightning termination preventer (LTP) system for preventing a lightning discharge termination between a cloud and a protected facility, said LTP system comprising:
    at least one discrete ionizer structure rising above an earth's surface and the protected facility;
    wherein a corona is formed over the ionizer structure during a lightning stroke;
    said ionizer structure further comprising a substantially flat horizontal array of a plurality of vertically oriented ionizer protrusions;
    said array comprising a criss-crossed grid of the vertically oriented ionizer protrusion;
    said array supported by a frame; and
    said frame supported by a support structure above a ground surface adjacent the protected facility.

2. The LTP system of claim 1 further comprising a skirt extending downwardly at an approximately 90 degree angle relative to a peripheral edge of said substantially flat horizontal array.

3. The LTP system of claim 1, wherein said vertically oriented ionizer protrusions are displaced from said substantially flat horizontal array at an approximately 90 degree angle relative to said substantially flat horizontal array.

4. The LTP system of claim 1, wherein said vertically oriented ionizer protrusions each comprise a blunt distal end.

5. The LTP system of claim 4, wherein said blunt distal end further comprises an essentially flat surface.

6. The LTP system of claim 4, wherein said blunt distal end further comprises a rounded surface.

7. The LTP system of claim 4, wherein said blunt distal end further comprises a dome shape.

8. The LTP system of claim 1 further comprising a density of said vertically oriented ionizer protrusions ranging from 50 to 200 vertically oriented ionizer protrusions per square meter.

9. The LTP system of claim 1, wherein said vertically oriented ionizer protrusions each comprise a length ranging from 5 to 20 centimeters.

10. The LTP system of claim 1 further comprising an endless ground current collector structure connected to said ionizer structure, said endless ground current collector structure having at least one downwardly extended grounded charge collecting rod, thereby forming an electrically floating island around the protected facility.

11. A lightning termination preventer (LTP) system for preventing a lightning stroke termination between a cloud and an exhaust stack, said system comprising:
    at least one discrete ionizer structure disposed in an essentially horizontal plane over a distal end of said exhaust stack;
    wherein a corona is formed over the ionizer structure during a lightning stroke; and
    said ionizer structure further comprising a substantially flat horizontal array of a plurality of vertically oriented ionizer protrusions.

12. The system of claim 11, wherein said vertically oriented ionizer protrusions each further comprise a blunt distal end.

13. The system of claim 12, wherein said blunt distal end further comprises an essentially flat surface.

14. The system of claim 12, wherein said blunt distal end further comprises a rounded surface.

15. A lightning termination preventer (LTP) system, said LTP system comprising:
    a plurality of interconnected modules having a support frame which is supported above a ground segment by a support structure;
    said interconnected modules forming a substantially flat array oriented along a horizontal plane; and
    said interconnected modules further comprising a plurality of vertically oriented ionizer protrusions arranged in a criss-crossed grid.

16. The system of claim 15, wherein each of said vertically oriented ionizer protrusions further comprises a blunt distal end.

17. The system of claim 16, wherein said blunt distal end comprises an essentially flat surface.

18. The system of claim 16, wherein each of said blunt distal ends further comprise a rounded surface.

19. A process of determining a protection area of a lightning termination preventer (LTP) system as a function of height above a ground segment ($h_x$), the process comprising the steps of:
    providing a substantially flat array of vertically oriented ionizer protrusions electrically connected to the ground segment wherein the substantially flat array is located a distance h in meters above the ground segment;
    estimating a peak current of a lightning return stroke (I);
    estimating a charge (Q) of a lightning stepped leader, wherein $$Q = 10^{\frac{1-\log(10.6)}{0.7}};$$

estimating a striking distance (d), wherein $$d = \sqrt{\frac{(0.2)(2)(9)(10^6)Q}{500}};$$

estimating a radius of protection zone for a single ionizer protrusion at a ground segment level ($R_s$), wherein $R_s = \sqrt{d^2-(d-h)^2}$;

estimating a radius of protection zone at the ground segment level for the substantially flat array of vertically oriented ionizer protrusions ($R_0$), wherein $R_0 = \sqrt{(R_s^2+h^2)(kN)^{2/3}-h^2}$;

wherein k is an efficiency factor;

wherein N is a number of ionizer protrusions in the substantially flat array of vertically oriented ionizer protrusions; and estimating a radius of protection zone at $h_x$ for the substantially flat array of vertically oriented ionizer protrusions ($R_x$), wherein $$R_x = R_0\left(1 - \sqrt{\frac{2dh_x - h_x^2}{2dh - h^2}}\right).$$

20. The process of claim 19, wherein k is equal to 0.1.

* * * * *